Figure 1:
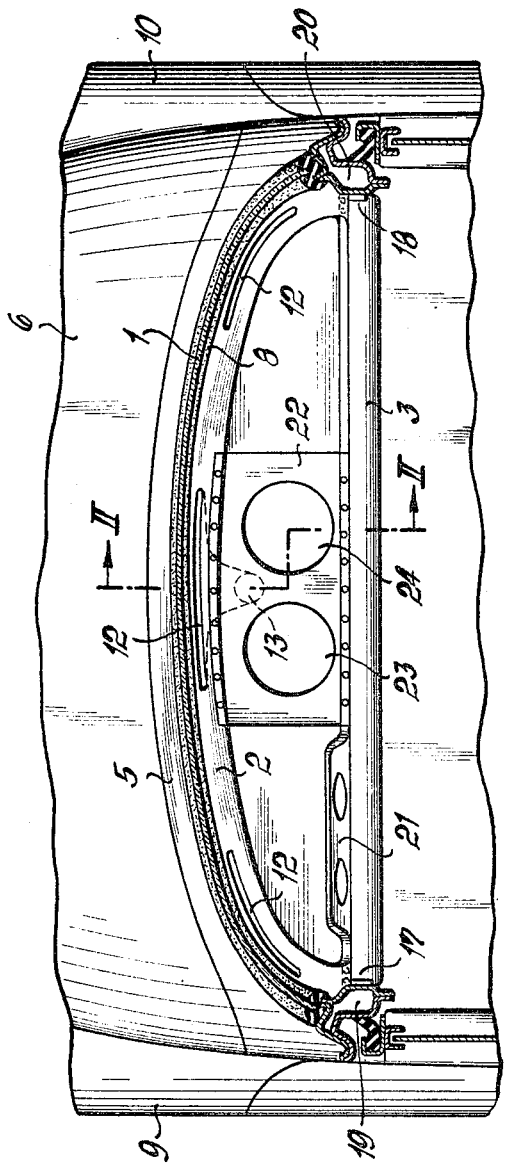

Nov. 1, 1966  E. KOMENDA  3,282,622
INSTRUMENT PANEL FOR VEHICLES
Filed June 1, 1964  2 Sheets-Sheet 1

INVENTOR
Erwin KOMENDA
BY Dicke + Craig
ATTORNEYS

Nov. 1, 1966   E. KOMENDA   3,282,622
INSTRUMENT PANEL FOR VEHICLES
Filed June 1, 1964   2 Sheets-Sheet 2
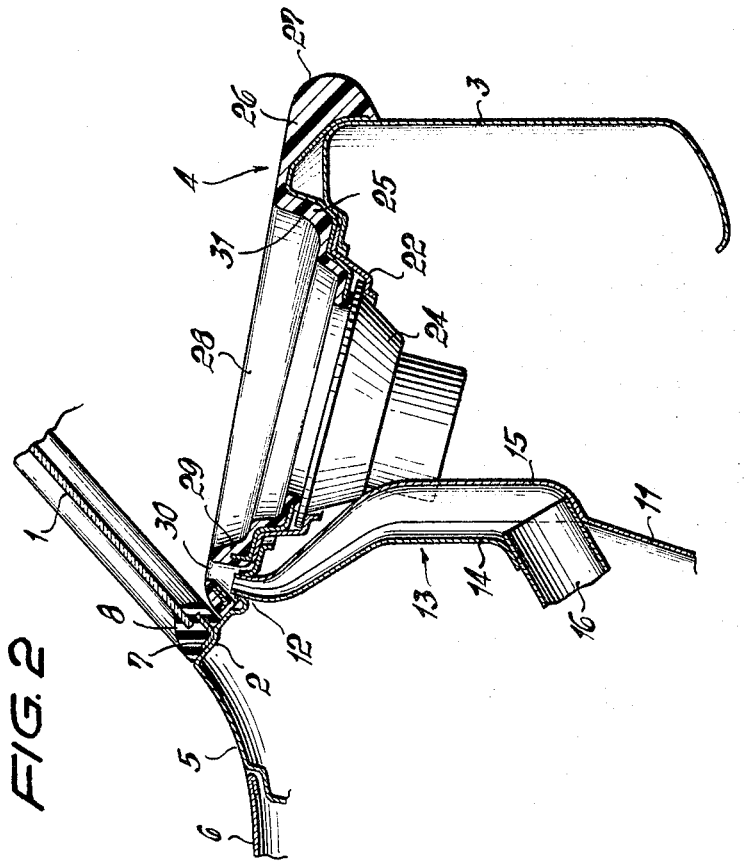
INVENTOR
Erwin KOMENDA
BY Dicke + Craig
ATTORNEYS

United States Patent Office 3,282,622
Patented Nov. 1, 1966

3,282,622
INSTRUMENT PANEL FOR VEHICLES
Erwin Komenda, Stuttgart, Germany, assignor to Firma Dr. Ing. h.c.F. Porsche K.G., Stuttgart-Zuffenhausen, Germany
Filed June 1, 1964, Ser. No. 371,611
Claims priority, application Germany, June 27, 1963, P 32,087
2 Claims. (Cl. 296—70)

The present invention relates to an instrument panel for vehicles, especially motor vehicles with a windshield curved in the transverse plane whereby the instrument panel is arranged below the windshield, consists of several parts, and includes a flexible cover.

Instrument panels are known already which are constructed as a large, unitarily formed or preshaped part made in one piece. It is also known in the prior art to compose the instrument panel of a motor vehicle of several stampings or pressed-out parts which are rigidly combined with each other into a single structural part. With the use of instrument panels for vehicles constructed in the manner of the type described in the beginning, there results a large structural part by means of which the accessibility to the units and aggregates provided at and below the instrument panel is greatly impaired and rendered more difficult.

This is avoided according to the present invention in that the instrument panel essentially consists of a pressed-out or stamped-out part extending generally horizontally along the windshield and of an essentially rectilinearly extending wall part which is connected at the ends thereof with the pressed-out or stamped-out part whereby both parts are bridged by a cover. The instrument panel is thereby subdivided into a number of parts rigidly connected with the vehicle body or frame and into a detachably arranged cover, whereby the rigidly arranged parts of the instrument panel serve for the reinforcement of the vehicle body and yet still permit a free access to the instruments and units or aggregates by their extension at a distance from one another. The instruments and units or aggregates below or within the instrument panel are readily accessible also for control and servicing by reason of the detachable cover. Furthermore, the advantage results from the present invention that for the provision of a differing number of control instruments at the instrument panel; for example, with different types of a motor vehicle such as touring cars, sports cars, and racing cars, only a relatively small stamped-out or wall part of different configuration has to be provided for each model so that the expenditures necessary therefor are slight.

The pressed-out part extending along the windshield pane is made in one piece with the cowl of the vehicle, is supported at the dashboard thereof, and is provided in the proximity of the windshield pane with apertures for the discharge of air for the ventilation of the windshield pane which are in communication with lines or ducts extending along the dashboard. An advantageous combination of the vehicle body parts is achieved thereby and the costs and expenditures are decreased. The lines or ducts leading to the ventilating apertures are constituted by the dashboard in conjunction with additional parts whereby in an advantageous manner, each of the lines or ducts is constituted by a channel-shaped indentation or pressed-in portion of the dashboard extending up to the ventilating aperture as well as by an oppositely pressed-out additional wall part. As a result of these measures, a spatially advantageous arrangement of the parts as well as a simple reinforcement requiring no additional expenditures is realized by the indentations or pressed-in portions in the dashboard supporting the instrument panel and the stampings or pressings.

The wall part of the instrument panel is supported within the area between its ends at the stamped-out part by one or several brackets or struts. As a result thereof, the wall part need not be provided with deep pressed-out contours so that the configuration thereof can be realized in a more free manner. Additionally, vibrations of the wall parts are avoided thereby. The strut serves as bearer for additional aggregates and units such as, for example, loudspeakers.

The cover in accordance with the present invention essentially consists of a formed or pressed-out part provided with elastic protective padding, whereby the protective padding is provided with a padding bulge disposed within the area of the wall part. The cover forms or is provided with a channel-shaped recess extending between the windshield and the padding bulge as storage space. The channel-shaped storage space is limited with respect to the windshield pane by a strip or ledge-like member which extends within the area of the ventilating apertures of the pressed-out part and is provided with slots that cooperate with the ventilating apertures. The padding bulge disposed within the area of the wall part of the instrument panel serves simultaneously as handle member.

Accordingly, it is an object of the present invention to provide an instrument panel for vehicles, especially motor vehicles, which avoids, by simple means the aforementioned shortcomings and drawbacks encountered with the prior art constructions.

Another object of the present invention resides in the provision of an instrument panel for vehicles which enhances the accessibility to the parts supported within or below the instrument panel.

A further object of the present invention resides in a multi-partite instrument panel for motor vehicles which facilitates servicing of the instruments and dashboard accessories, yet is relatively inexpensive to manufacture and assemble and consists of parts that can be given any design and configuration as deemed most appropriate.

Another object of the present invention resides in the provision of an instrument panel for motor vehicles made of a number of rigidly connected parts which includes a detachable cover, preferably having protective padding, to enable ready access to the instruments and instrument panel accessories.

A further object of the present invention resides in the provision of an instrument panel for motor vehicles which minimizes the extent of modifications of the instrument panel in case of use thereof for different types of vehicles.

Still another object of the present invention resides in the provision of an instrument panel for motor vehicles which advantageously provides heating and ventilating ducts for the windshield, while, at the same time, offering substantial reinforcements also to the vehicle body.

Another object of the present invention resides in the provision of an instrument panel for motor vehicles made of several parts which avoids vibrations by the possibility of suitable design of the component parts thereof without sacrifice to rigidity, for example, as suitable bearer supports for auxiliary units.

These and other objects, features and advantages of the present invention will become more obvious from the following description when taken in connection with the accompanying drawing which shows, for purposes of illustration only, one embodiment in accordance with the present invention and wherein FIGURE 1 is a horizontal cross-sectional view through a motor vehicle within the area of the windshield with the pressed-out parts or stampings, shown in plan view, which participate in the formation of the instrument panel in accordance with the present invention, and FIGURE 2 is a cross-sectional view, on an enlarged scale, through the instrument panel, taken along line II—II of FIGURE 1.

Referring now to the drawing wherein like reference numerals are used throughout the two views to designate like parts, the instrument panel of the vehicle illustrated therein is composed essentially of a pressed-out part or stamping 2 extending below the windshield pane 1, of a wall part 3, and of a cover generally designated by reference numeral 4 (FIG. 2). The pressed-out part or stamping 2 is made in one piece with the cowl 5 of the vehicle. A hood 6 adjoins the cowl 5. The pressed-out part 2 is provided with a sectional strip 7 on which is held a seal 8 receiving the windshield pane 1. The pressed-out part 2 extends over the width of the windshield 1 whereby the fenders 9 and 10 of the motor vehicle laterally adjoin the pressed-out part 2.

The pressed-out part 2 is supported at an essentially upright dashboard 11 and is provided with apertures 12 which are located in proximity to the windshield pane 1. The apertures 12 are each in communication with a respective line or duct generally designated by reference numeral 13 through which fresh and/or heated air is selectively conducted to the windshield pane 1 (FIG. 2). Each of these lines or ducts 13 is constituted by the dashboard 11 and an additional pressed-out part or stamping 14. The dashboard 11 is thereby provided with a channel-shaped indentation 15 extending up to the aperture 12 in the pressed-out part 2 and the additional pressed-out part 14 is pressed-out correspondingly in the opposite direction so that upon assembling and joining these two parts, there is created the line or duct 13. A possibly elastic line or pipe 16 is connected to the rigid line or duct 13 which leads in a manner known per se and not illustrated therefore in detail in the drawing, for example, to a mixing chamber, blower, or fresh air inlet.

The wall part 3 is constructed preferably as unitary sheet metal stamping and extends over the width of the windshield pane 1. The ends 17 and 18 (FIG. 1) of the wall part 3 are suitably connected to the pressed-out part 2. Additionally, the wall part 3 is secured at columns 19 and 20 of the vehicle body forming a frame for the windshield 1. The wall part 3 possesses an essentially U-shaped across section with a channel open in the direction toward the dashboard 11 and is provided with an extension 21 (FIG. 1) which forms a bearer for the instruments of the motor vehicle. The wall part 3 is supported at the pressed-out part 2 by a strut or bracket or by a suitably shaped wall structure 22. This wall structure 22 simultaneously forms a bearer for the loudspeakers 23, 24.

The cover generally designated by reference numeral 4 consists of an essentially form-rigid pressed-out part 25 made of cardboard, sheet metal, plastic, or the like which is provided with a layer of elastically yielding material; such as, foam rubber, rubber hair, or the like. Advantageously, the yielding layer is provided with a cover foil not illustrated in detail in the drawing. The protective padding forms a bulge 27 within the area of the wall part 3. The cover 4 is provided with a channel- or groove-shaped recess 28 which serves for the deposit and storage of small objects, maps, or the like. The recess 28 is limited with respect to the windshield pane 1 by a strip 29 which extends preferably always at a constant distance from the windshield pane within the area of the ventilating apertures 12 of the pressed-out part 2. Openings 30 corresponding to the apertures 12 are provided in the strip 29 through which is conducted the air flowing through the line or duct 13 against the windshield 1. The strip 29 forms simultaneously a boundary for the objects lying in the channel-shaped recess 28 so that any covering up of the openings 30 and/or of the apertures 12 by the objects is prevented thereby. The section 31 of the recess 28 which is disposed adjoining the bulge 27, forms simul-taneously a handle section for the passengers. The handle is simultaneously reinforced by a corresponding construction of the pressed-out part 25, possibly also by additional form-rigid parts.

While I have shown and described one embodiment in accordance with the present invention, it is understood that the same is not limited thereto but is susceptible of numerous changes and modifications as known to a person skilled in the art; and I therefore do not wish to be limited to the details shown and described herein, but intend to cover all such changes and modifications as are encompassed by the scope of the appended claims.

I claim:

1. In a vehicle, especially in a motor vehicle having a windshield curved in a transverse plane, an instrument panel arranged below the windshield and composed of several parts, comprising:
   a pressed-out means extending generally horizontally along the windshield and provided with apertures in proximity to the windshield,
   approximately rectilinearly and vertically extending wall means connected at the ends thereof with said pressed-out means,
   and cover means bridging the two parts consisting of the first pressed-out means and the wall means,
   said cover means including a pre-shaped part provided with elastic protective padding means, said padding means including padded bulge means within the area of the wall means,
   said cover means being provided with a channel-shaped recess between the windshield pane and the padded bulge means and serving as storage space,
   and strip means delimiting the channel-shaped recess against the windshield, said strip means extending within the area of the apertures of the pressed-out means and being provided with slots cooperating with said apertures.

2. In a vehicle, especially in a motor vehicle having a cowl, a dashboard, and a windshield curved in a transverse plane, an instrument panel arranged below the windshield and composed of several parts, comprising:
   first pressed-out means extending generally horizontally along the windshield,
   approximately rectilinearly and vertically extending wall means connected at the ends thereof with said first pressed-out means,
   and cover means bridging the two parts consisting of the pressed-out means and the wall means,
   the first pressed-out means being made in one piece with the cowl of the vehicle, and said first pressed-out means being supported at said dashboard and being provided in proximity of the windshield with apertures for the discharge of air for ventilating and heating the windshield, and duct means extending along the dashboard and in communication with said apertures,
   said duct means being constituted by said dash board in combination with additional pressed-out parts,
   and each duct means being constituted by a channel-shaped indentation in the dashboard extending up to a respective aperture and by an additional wall part pressed-out in the opposite direction,
   and strut means for supporting said wall means at said pressed-out means within the area between the ends thereof,
   said strut means serving as bearer for additional units,
   said cover means including a formed part provided with elastic protective padding means, said padding means including padded bulge means disposed within the area of the wall means,
   said cover means being provided with a channel-shaped recess between the windshield pane and the padded bulge means and serving as deposit storage space,
   and strip means for delimiting the channel-shaped recess against the windshield, said strip means extending within the area of the apertures of the pressed-out means and being provided with slots co-operating with said apertures, the padded bulge means disposed within the area of the wall means serving as handle grip.

References Cited by the Examiner

UNITED STATES PATENTS

| | | | |
|---|---|---|---|
| 2,066,021 | 12/1936 | Tjaarda | 180—90 |
| 2,651,986 | 9/1953 | Greig | 180—90 |
| 2,720,932 | 10/1955 | Arpels | 180—90 |
| 2,818,933 | 1/1958 | Tell | 180—90 |
| 2,966,952 | 1/1961 | Wilfert | 180—90 |

FOREIGN PATENTS 1,235,036   5/1960   France.

BENJAMIN HERSH, *Primary Examiner.*

J. H. BRANNEN, *Assistant Examiner.*